United States Patent
Kocienda et al.

(10) Patent No.: US 12,556,916 B1
(45) Date of Patent: Feb. 17, 2026

(54) DEVICE SETUP/CONFIGURATION USING ACTIVATION CARD

(71) Applicant: Hewlett-Packard Development Company, L.P., Spring, TX (US)

(72) Inventors: Kenneth Luke Kocienda, Mill Valley, CA (US); Imran A. Chaudhri, San Francisco, CA (US); Paul Miller, San Francisco, CA (US); Ralph Brunner, Los Gatos, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 15 days.

(21) Appl. No.: 18/637,445

(22) Filed: Apr. 16, 2024

Related U.S. Application Data

(60) Provisional application No. 63/460,013, filed on Apr. 17, 2023.

(51) Int. Cl.
  *G06F 7/04* (2006.01)
  *H04W 12/06* (2021.01)
  *H04W 12/77* (2021.01)

(52) U.S. Cl.
  CPC ............ *H04W 12/06* (2013.01); *H04W 12/77* (2021.01)

(58) Field of Classification Search
  CPC .... H04W 12/06; H04W 12/77; H04L 63/083; H04L 63/0853; G06F 21/31
  See application file for complete search history.

(56) References Cited

U.S. PATENT DOCUMENTS

| | | | |
|---|---|---|---|
| 10,074,231 B2* | 9/2018 | Miranda | G06Q 20/352 |
| 2015/0012427 A1* | 1/2015 | Phillips | G06Q 30/018 |
| | | | 705/41 |
| 2016/0112867 A1* | 4/2016 | Martinez | H04W 12/08 |
| | | | 455/558 |
| 2020/0311715 A1* | 10/2020 | Heidari | G06Q 20/3276 |
| 2022/0415112 A1* | 12/2022 | Weisbecker | G06Q 20/354 |

OTHER PUBLICATIONS

Dhonge et al, Optical Wireless Authentication for Smart Devices Using an Onboard Ambient Light Sensor, Aug. 7, 2014, IEEE, pp. 1-8. (Year: 2014).*

F. de la Puente et al., Pocket Device for Authentication and Data Integrity on Internet Banking Applications, Oct. 16, 2003, IEEE, pp. 43-50. (Year: 2003).*

* cited by examiner

*Primary Examiner* — Philip J Chea
*Assistant Examiner* — Jenise E Jackson
(74) *Attorney, Agent, or Firm* — Fish & Richardson P.C.

(57) ABSTRACT

Embodiments are disclosed for device setup and configuration using an activation card. In some embodiments, a method comprises: sending an activation card to a user, the activation card for setting up or configuring a device for the user using an online service, the activation card including one or more codes; sending the device to the user; receiving activation data from the device, the activation data including or related to the one or more codes; and authenticating the user based on the activation data. In some embodiments, the activation card includes two codes: a smile code that encodes a numeric value in a picture printed on the activation card and an invisible code printed with invisible ink (e.g., IR ink) on the activation card using invisible ink.

8 Claims, 5 Drawing Sheets

DEVICE SETUP/CONFIGURATION USING ACTIVATION CARD

CROSS-REFERENCE TO RELATED APPLICATION

This application claims priority to U.S. Provisional Patent Application No. 63/460,013, filed Apr. 17, 2023, the entire contents of which are incorporated herein by reference.

TECHNICAL FIELD

This disclosure relates generally to setup and configuration of electronic devices.

BACKGROUND

Consumer devices, such as smartphones, tablet computers and smartwatches, require a user to go through a setup and configuration process before the device is fully functional. For example, after powering on the device the user is provided with step-by-step instructions for setting up and configuring their device (e.g., selecting language, time zone, location, permissions). During this process, the device may be connected to a wireless network (e.g., the user's WIFI network), which allows the user to setup an email account or other service with an online service provider. Some setup and configuration processes require authentication, which is the verification of the user's identity through the use of the device to ensure secure access to the device and/or services.

SUMMARY

Embodiments are disclosed for device setup and configuration using an activation card.

In some embodiments, a method comprises: sending an activation card to a user, the activation card for setting up or configuring a device for the user using an online service, the activation card including one or more codes; sending the device to the user; receiving, with the at least one processor, activation data from the device, the activation data including or related to the one or more codes; and authenticating, with the at least one processor, the user based on the activation data.

In some embodiments, the method further comprises: receiving, with the at least one processor, an image uploaded by the user; creating, with the at least one processor, the activation card including the one or more codes and the image uploaded by the user; and receiving, with the at least one processor, the activation data from the device, the activation data including or related to the one or more codes and the image.

In some embodiments, the activation card includes two codes: a smile code that encodes a numeric value in a picture printed on the activation card and an invisible code printed on the activation card using invisible ink.

In some embodiments, the smile code includes dots of varying sizes that are positioned at fixed distances from each other to form the picture.

In some embodiments, the dot sizes and dot positions indicate one or more bit values.

In some embodiments, the dot positions and their associated one or more bit values indicate a numeric value.

In some embodiments, the invisible ink is infrared ink.

In some embodiments, the invisible code is one of a smile code, a quick response (QR) code or a numeric value represented in alphanumeric characters.

In some embodiments, the invisible code is used as a checksum or verification of the smile code.

In some embodiments, the smile code is used as a checksum or verification of the invisible code.

In some embodiments, the method further comprises: prior to sending the device to the user: determining, with the at least one processor, that the user has logged into the online service; requesting, with the at least one processor, user data from the user; receiving, with the at least one processor, the user data; authenticating a physical location of the user; and pre-configuring the device with configuration data based on the user data.

In some embodiments, the configuration data includes at least one of user selected subscriptions, services or applications.

In some embodiments, a method comprises: capturing, with a visible light sensor of a device, a first code printed on an activation card; capturing, with an infrared (IR) light sensor of the device, a second code printed on the activation card, the second code printed in IR ink; sending, to an online user authentication service, the first code and the second code; receiving, from the online user authentication service, data indicating results of the user authentication performed by the online user authentication service; and responsive to the results indicating that user authentication was successful, activating one or more functions of the device; and responsive to the results indicating that the user authentication failed, presenting a message on the device indicating that user authentication has failed.

In some embodiments, the first code is a smile code that encodes a numeric value in a picture printed on the activation card.

In some embodiments, the method further comprises: capturing, with the visible light sensor of the device, an image that was previously uploaded by the user to the online authentication service; and sending, to the online user authentication service, the image.

In some embodiments, the visible light sensor and IR light sensor are included in a single camera module.

In some embodiments, a system comprises: an online service to: send an activation card to the user, the activation card for setting up or configuring a device for the user using the online service, the activation card including one or more codes; send the device to the user; receive activation data from the device, the activation data including or related to the one or more codes; authenticate the user based on the activation data; and the device to: capture, with a visible light sensor of the device, a first code printed on an activation card; capture, with an infrared (IR) light sensor, a second code printed on the activation card, the second code printed in IR ink; send, to an online user authentication service, the first code and the second code; receive, from the online user authentication service, data indicating results of the user authentication performed by the online user authentication service; responsive to the results indicating that user authentication was successful, activate one or more functions of the device; and responsive to the results indicating that the user authentication failed, present a message on the device indicating that user authentication has failed.

In some embodiments, the one or more codes are created based at least in part on information provided by the user during a check-out process at an online store where the user purchased the device online.

In some embodiments, a first side of the activation card has the image and a second, opposite side of the activation card includes the first and second codes.

In some embodiments, the IR light sensor captures an image of a palm of the user for identifying the user in subsequent access to the device or service through the device.

Advantages of the disclosed system and method include but are not limited to: 1) the card has a flat form which encourages users to store the card with other important documents; 2) the card is two-sided where, where in some embodiments one side includes a user-customized image, and the other side has two machine-readable codes; 3) the car is small enough to hold in one hand so it can be presented to an IR camera; 4) the card provides the user with an easy path to a website for set-up and configuration of the mobile device; and 5) the card facilitates fast and secure authentication using two machine-readable authentication codes (e.g., 10 sec or less), which can be used to confirm each other.

The details of one or more implementations of the subject matter are set forth in the accompanying drawings and the description below. Other features, aspects and advantages of the subject matter will become apparent from the description, the drawings and the claims.

DETAILED DESCRIPTION

The disclosed setup and configuration process uses an activation card with machine-readable codes for user authentication. The activation card and the machine-readable codes are created especially for each user and their device. The machine-readable codes are used to determine that the user has rightful possession of the device (e.g., purchased the device), and to authenticate the user so that the user can gain access to a pre-populated online user account and/or registration information.

System Overview

Figure 1:
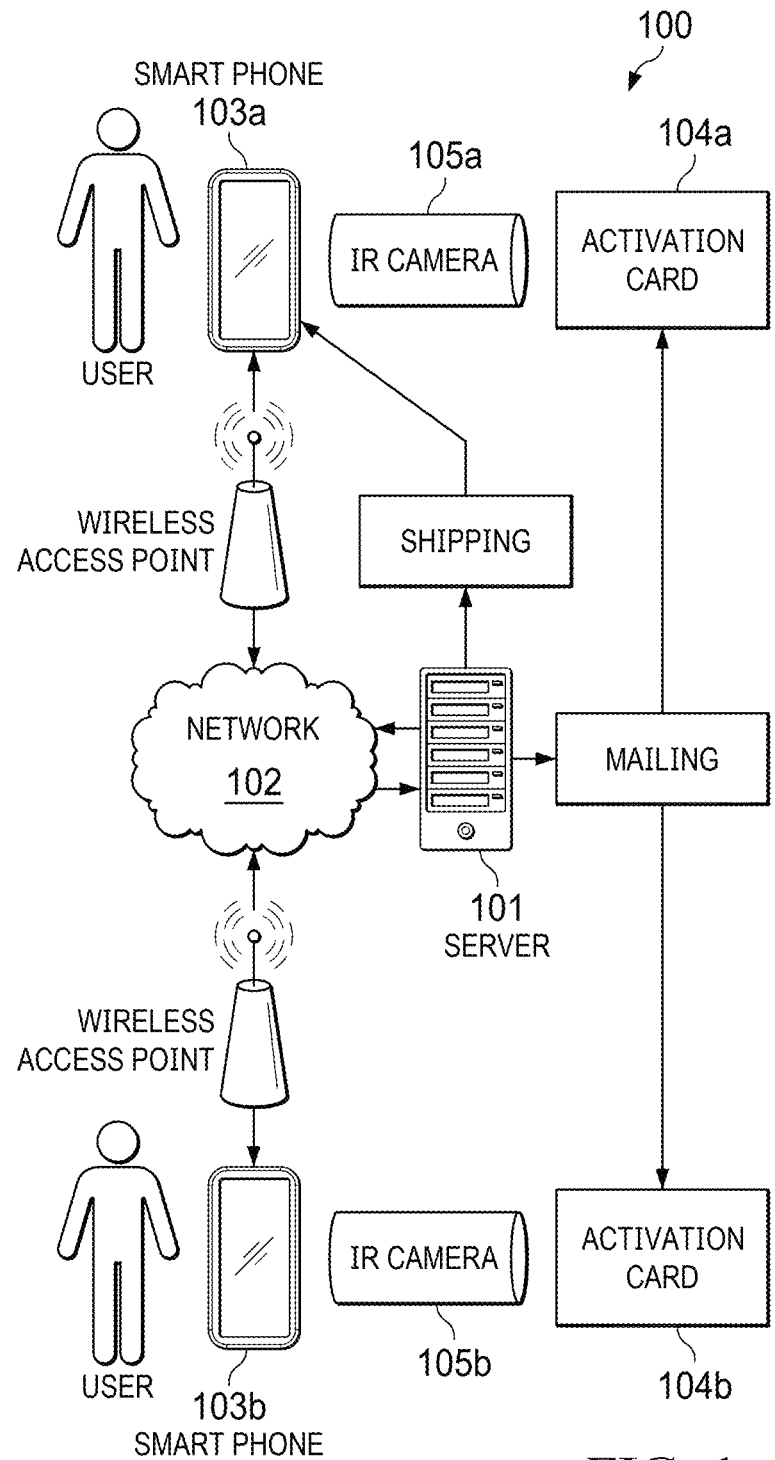
FIG. 1 illustrates a system for setting up and configuring a device using an activation card, according to some embodiments.

FIG. 1 illustrates a system 100 for setting up and configuring a device using an activation card, according to some embodiments. System 100 includes server 101 operated by an online service provider, such as an online store, authentication service or any other online entity that allows a user to authenticate themselves through their device, commonly referred to as mobile authentication. In the embodiments that follow, the device can be any electronic device, whether mobile or not, such as computer, smartphone, smartwatch, fitness band, tablet computer, television, media player, etc. In the example system 100 shown, there are two users who are using system 100 through their respective devices and wireless access points at different geographic locations. In a practical system 100, there would be many more users and devices concurrently using system 100. In some embodiments, there can be multiple servers 101 located at the same and/or different geographic locations (e.g., regional or edge servers).

When the users purchase their respective devices 103a, 103b from an online store implemented by server 101 connected to network 102 (e.g., the World Wide Web via the Internet), the users participate in a check-out process where the users can select various options for their devices and/or services related to their devices, and provide their user information (e.g., mailing address, mobile number, password, user ID, credit card number) to setup their online user accounts. In some embodiments, each user's information includes image 107 (See FIG. 2) uploaded by the user to server 101 (e.g., using a browser or drag n drop window). Image 107 can be any image that the user selects from their personal computer/device photo library or any other image source. Server 101 associates the user's account with the image and other user information.

The information collected from the users is used by server 101 to create unique activation cards 104a, 104b, which are mailed to the users at their respective home addresses, or sent electronically their personal devices (e.g., smartphone, computer) for printing on their home network printer or scanned or otherwise captured from a display by a scanning device (e.g., a smartphone camera), or picked up at a designated location (e.g., a brick and mortar store).

Figure 2A:
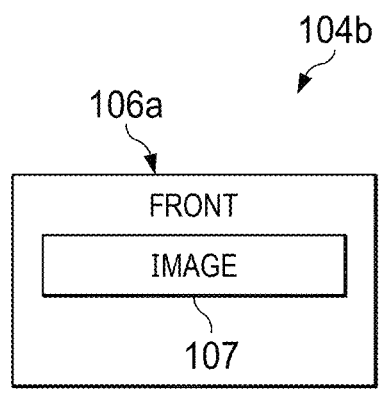
FIGS. 2A and 2B illustrate the front and back side of an activation card, according to some embodiments.
Figure 2B:
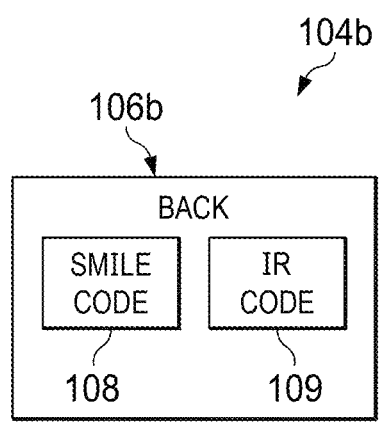

In an embodiment, each activation card 104a, 104b includes image 107 uploaded by the user and two unique machine-readable activation codes 108, 109, as shown in FIG. 2. In some embodiments, activation codes 108, 109 are printed on frontside 106a of activation cards 104a, 104b, and the codes are on backside 106b of activation cards 104a, 104b. In other embodiments, one or both codes 108, 109 are printed on the same side as image 107. In other embodiments, there is only one authentication code or more than two authentication codes.

When the users receive their respective activation cards 104a, 104b in the mail or electronically, the users can log into their respective user accounts and setup/configure their respective devices, subscription services, applications, sync data, etc. In some embodiments, the login process uses image 107 for image-based authentication of the user, and also provides a path directly to the user's account that was setup/configured (e.g., pre-populated) during the check-out process. The login process also authenticates the physical location of the user based on the location where of the device they are using to login compared to information obtained during the check-out process. After the user finishes the setup/configuration process for their device, the device is shipped to the users designated location (e.g., the user's home or work address, a brick and mortar store address, post office box, etc.).

When the users receive their respective devices 103a, 103b, the users login into their respective user accounts and initiate a registration and user authentication process with server 101 using the activation codes 108, 109 printed on their respective activation cards 104a, 104b. Visible light sensor of devices 103a, 103b are used to capture an image of first activation code 108 (e.g., a smile code) and IR light sensors of devices 103a, 103b are used to capture the second code 109 (e.g., a code printed in invisible ink). In the example shown, a single camera module 105a, 105b is shown that includes both a visible light sensor and an IR light sensor, which is commonly referred to as a red, green, blue-infrared camera (RGB-IR) camera. In some embodiments, the IR light sensor captures an image of a palm of the user for identifying the user in subsequent access to the device or service through the device.

Referring to FIG. 2, an embodiment of activation card 104*b* is shown that includes image 107 printed on frontside 106*a* of activation card 104*b*, and first and second activation codes 108, 109 printed on backside 106*b* of activation card 104*b*. In some embodiments, first activation code 108 is a "smile" code and second activation code 109 is an "invisible" code (i.e., invisible to the human eye). The smile code encodes a numeric value in a picture (e.g., a visually appealing picture) and the invisible code is printed using invisible ink, such that needs to be read using an appropriate sensor of the device.

The first and second codes 108, 109 are used during an initial registration process of the device during which codes 108, 109 are used to confirm each other. For example, first code 108 could be used as a checksum or verification of second code 109, or vice-versa. Codes 108, 109 can also be used at a later time for data recovery purposes, e.g., if a user loses their mobile device and they wish to restore to a replacement mobile device to contain the same data as their lost device. In some embodiment, an IR light sensor on the device reads the invisible code printed on the activation card with IR ink when the user presents the invisible code to the infrared light sensor. Because an IR light sensor is needed to read IR printing, it is unlikely that people will discover the invisible code and find a way to duplicate the code with an IR light sensor. The invisible code can be printed as another smile code, a quick response (QR) code or a numeric value represented in alphanumeric characters, or some combination of the foregoing.

Figure 3A:
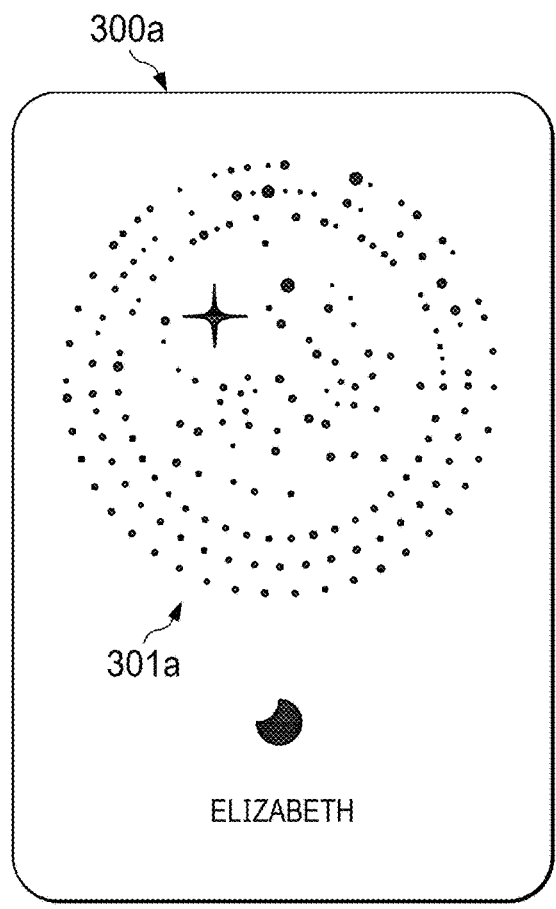
FIGS. 3A and 3B are examples of smile codes, according to some embodiments.
Figure 3B:
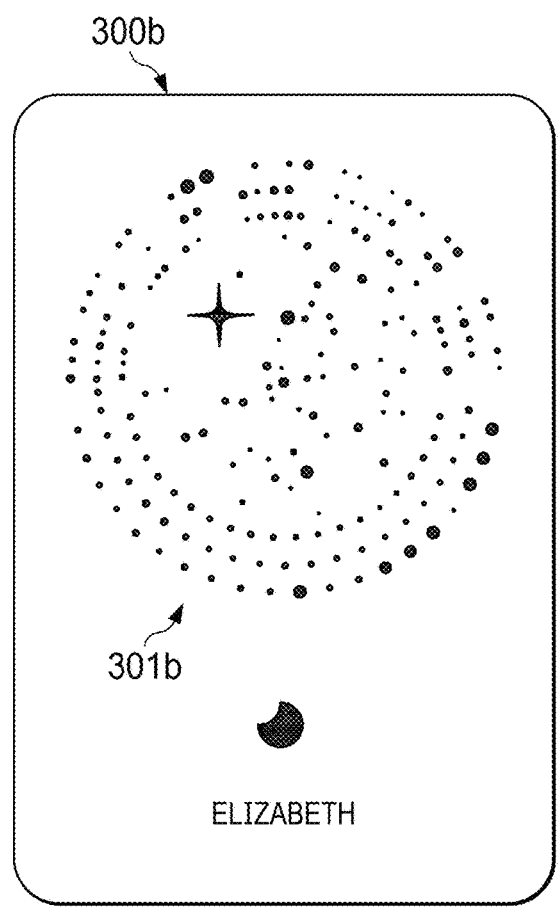

FIGS. 3A and 3B are examples of smile codes 301*a*, 301*b*, respectively, according to some embodiments. Smile codes 301*a*, 301*b* each comprise dots of varying sizes that are positioned at fixed distances from each other to form a picture. The size of the dots and their position indicates one or more bit values. The dot positions and their associated one or more bit values indicate a unique numeric value. In this example, the user Elizabeth presents the smile code to the RGB-IR camera of her device, to read the dot pattern (using RGB pixels) and extract the unique numerical value, which is used to authenticate Elizabeth. After a successful user authentication, the device will become at least partially functional. If the user authentication fails, then server 101 will send a failure message to the device which can be presented to Elizabeth via a display, audio output, force feedback, laser projection or any other output device.

Process Overview

Figure 4:
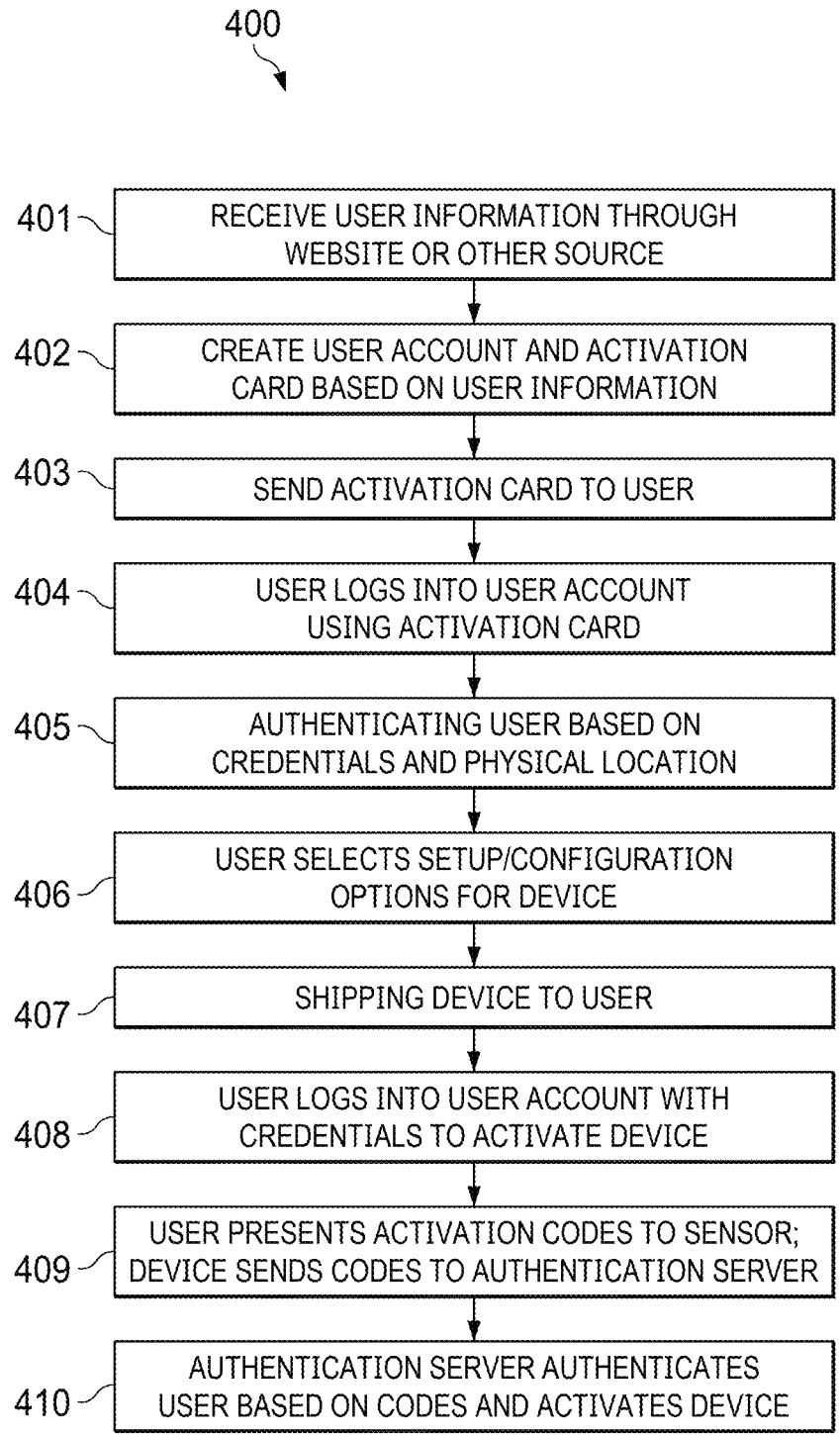
FIG. 4 is a flow diagram of a process for setting up and configuring a device using an activation card, according to some embodiments.

FIG. 4 is a flow diagram of a process 400 for setting up and configuring a mobile device using an activation card, according to some embodiments. Process 400 can be implemented using system 100 shown in FIG. 1 and the mobile device architecture shown in FIG. 5.

Process 400 includes the steps of: receiving user information through a website or other source (401); creating a user account and activation card based on the user information (402); sending the activation card to the user (403); the user logs into the user account using the activation card (404); authenticating user based on credentials and physical location (405); user selects setup/configuration options for the device (406); shipping device to the user (407); user logs into user account with credentials to register and activate the device (408); user presents activation codes to sensor of device and the device sends the codes to an authentication server (409); authentication server authenticates user based on codes, and if user authentication successful, activates the device (410).

In some embodiments, the user information is collected during a check-process of an online store, and includes an image uploaded to the online store by the server. In some embodiments, the user information is used to setup and pre-populate an online account for the user. In some embodiments, the activation card is mailed to the user's mailing address included in the user information. In other embodiments, a virtual activation card is emailed or messages to the user to the user's email address or mobile number. In some embodiments, there are two codes on the activation card: a first code is a smile code and a second code is an invisible code. In some embodiments, the smile code encodes and hides a numeric value in a picture. In some embodiments, the smile code employs dots of varying sizes that are positioned at fixed distances from each other to form the picture. In some embodiments, the size of the dots and their position indicates one or more bit values. In some embodiments, the dot positions and their associated one or more bit values indicate a numeric value. In some embodiments, the smile code is used during the activation process during which the two machine-readable codes are used to confirm each other. In some embodiments, the invisible code is printed on the activation card using IR ink. In some embodiments, the invisible code is used as a checksum and/or verification of the smile code or vice-versa. In some embodiments, the smile code and invisible coded are printed on one side of the activation card and the user uploaded image is printed on the other side of the activation card.

In some embodiments, prior to receiving the device the user logs into their user account and are authenticated at least in part using their uploaded image. For example, the user selects their image from a grid of images as an authentication step in addition to presenting their credentials (e.g., a user identifier (userID) and password). In some embodiments, the image on the activation card can be scanned by a scanner to create a direct path (e.g., URL) to the user's online account. In some embodiments, smile code can be scanned and used to provide a direct path to the user's online account or to initiate an authentication process with the authentication server. In some embodiments, the user is provided with a list of options for subscribing to services, pre-loading applications, syncing data, creating preferences or a user profile, etc. This information can be used to configure or personalize the device before it is shipped to the user.

After the device is received by the user, the user can initiate a registration and activation process for the device. In some embodiments, the image or smile code is used as a direct path to an authentication dialog where the user is instructed to present their activation card in front of the device sensor (e.g., an RGB-IR camera). This ensures that the user is authenticated and co-located with the device when the device is activated. Upon successful user authentication, the device is activated and fully functional. The smile and/or invisible code can be used at a later time for data recovery purposes, e.g., if a user loses their device and they wish to restore a replacement device to contain the same data as their lost device.

Example Device Architecture

Figure 5:
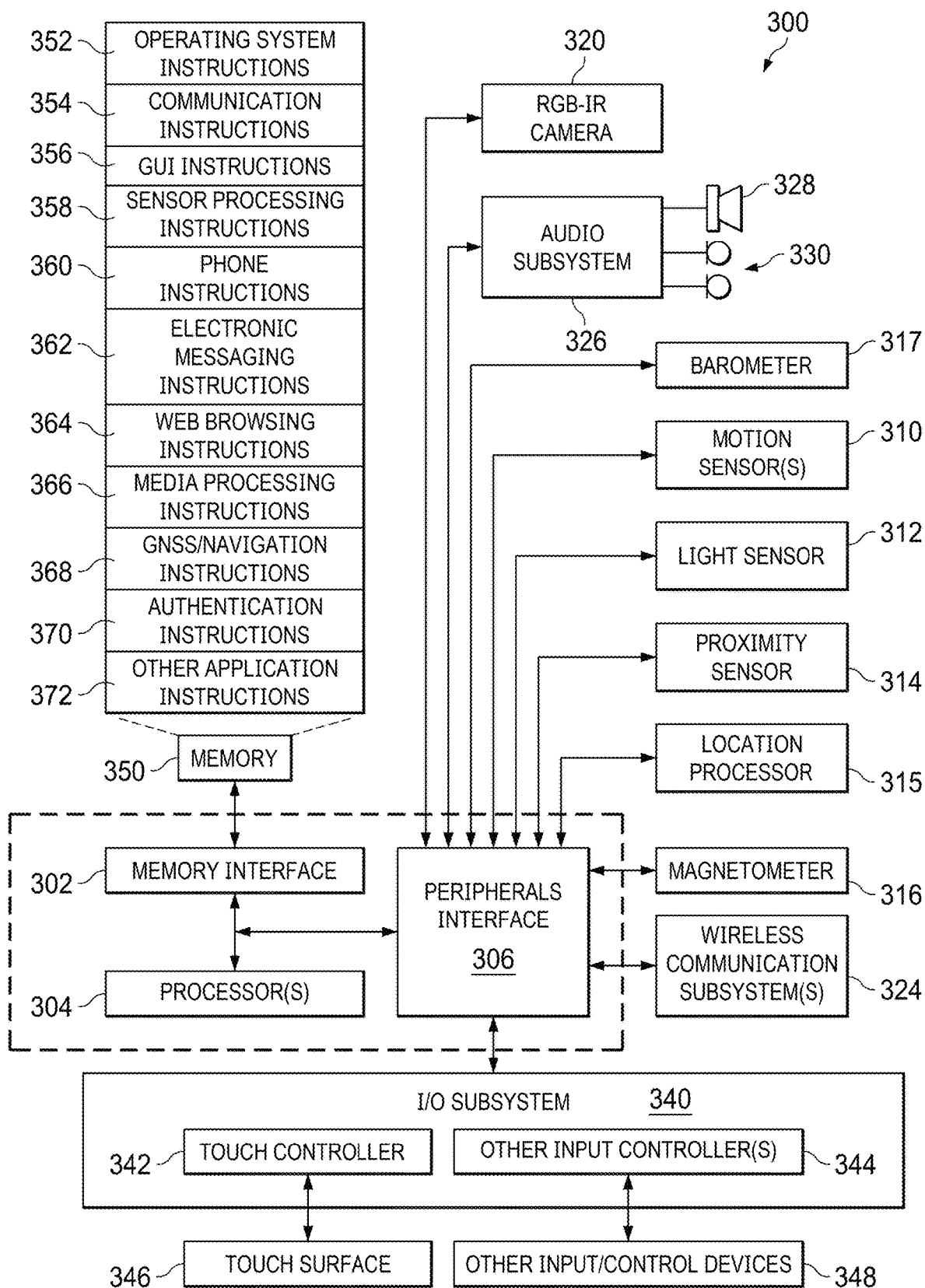
FIG. 5 is a block diagram of a device architecture for implementing the features and processes described in reference to FIGS. 1-4, according to some embodiments.

FIG. 5 is block diagram of a device architecture 500 for implementing the features and processes described in reference to FIGS. 1-4. Architecture 500 can be implemented in, for example, devices 103*a*, 103*b* described in reference to FIG. 1.

Architecture 500 can include memory interface 502, one or more hardware data processors, image processors and/or processors 504 and peripherals interface 506. Memory interface 502, one or more processors 504 and/or peripherals interface 506 can be separate components or can be integrated in one or more integrated circuits. System architecture 500 can be included in any suitable electronic device, including but not limited to: a smartwatch, smartphone, fitness band and any other device that can be attached, worn or held by a user.

Sensors, devices and subsystems can be coupled to peripherals interface 506 to provide multiple functionalities. For example, one or more motion sensors 510, light sensor 512 and proximity sensor 514 can be coupled to peripherals interface 506 to facilitate motion sensing (e.g., acceleration, rotation rates), lighting and proximity functions of the wearable device. Location processor 515 can be connected to peripherals interface 506 to provide geo-positioning. In some implementations, location processor 515 can be a GNSS receiver, such as the Global Positioning System (GPS) receiver. Electronic magnetometer 516 (e.g., an integrated circuit chip) can also be connected to peripherals interface 506 to provide data that can be used to determine the direction of magnetic North. Electronic magnetometer 516 can provide data to an electronic compass application. Motion sensor(s) 510 can include one or more accelerometers and/or gyros configured to determine change of speed and direction of movement. Barometer 517 can be configured to measure atmospheric pressure. Camera 520 can be separate visible light (e.g., CMOS RGB sensor) and IR light sensor or an RGB-IR camera, as described in reference to FIG. 1.

Communication functions can be facilitated through wireless communication subsystems 524, which can include radio frequency (RF) receivers and transmitters (or transceivers) and/or optical (e.g., infrared) receivers and transmitters. The specific design and implementation of the communication subsystem 524 can depend on the communication network(s) over which a mobile device is intended to operate. For example, architecture 500 can include communication subsystems 524 designed to operate over a GSM network, a GPRS network, an EDGE network, a Wi-Fi™ network and a Bluetooth™ network. In particular, the wireless communication subsystems 524 can include hosting protocols, such that the mobile device can be configured as a base station for other wireless devices.

Audio subsystem 526 can be coupled to a speaker 528 and a microphone 30 to facilitate voice-enabled functions, such as voice recognition, voice replication, digital recording and telephony functions. Audio subsystem 526 can be configured to receive voice commands from the user.

I/O subsystem 540 can include touch surface controller 542 and/or other input controller(s) 544. Touch surface controller 542 can be coupled to a touch surface 546. Touch surface 546 and touch surface controller 542 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 546. Touch surface 546 can include, for example, a touch screen or the digital crown of a smart watch. I/O subsystem 540 can include a haptic engine or device for providing haptic feedback (e.g., vibration) in response to commands from processor 504. In an embodiment, touch surface 546 can be a pressure-sensitive surface.

Other input controller(s) 544 can be coupled to other input/control devices 548, such as one or more buttons, rocker switches, thumb-wheel, infrared port and USB port. The one or more buttons (not shown) can include an up/down button for volume control of speaker 528 and/or microphone 530. Touch surface 546 or other controllers 544 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 546; and a pressing of the button for a second duration that is longer than the first duration may turn power to the mobile device on or off. The user may be able to customize a functionality of one or more of the buttons. The touch surface 546 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 502 can be coupled to memory 550. Memory 550 can include high-speed random access memory and/or non-volatile memory, such as one or more magnetic disk storage devices, one or more optical storage devices and/or flash memory (e.g., NAND, NOR). Memory 550 can store operating system 552, such as the iOS operating system developed by Apple Inc. of Cupertino, California. Operating system 552 may include instructions for handling basic system services and for performing hardware dependent tasks. In some implementations, operating system 552 can include a kernel (e.g., UNIX kernel).

Memory 550 may also store communication instructions 555 to facilitate communicating with one or more additional devices, one or more computers and/or one or more servers, such as, for example, instructions for implementing a software stack for wired or wireless communications with other devices. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Location instructions 568 to facilitate generic GNSS and location-related processes and instructions; and instructions 570 that implement the features and processes described in reference to FIGS. 1-4. Memory 550 further includes other application instructions 572 including but not limited to instructions for setup/configuration applications, etc.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the mobile device may be implemented in hardware and/or in software, including in one or more signal processing and/or application specific integrated circuits.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A method comprising:
    capturing, with a visible light sensor of a device, a first code printed on an activation card;
    capturing, with an infrared (IR) light sensor of the device, a second code printed on the activation card, the second code printed in IR ink;
    sending, to an online user authentication service, the first code and the second code;
    receiving, from the online user authentication service, data indicating results of the user authentication performed by the online user authentication service; and
    responsive to the results indicating that user authentication was successful, activating one or more functions of the device; and
    responsive to the results indicating that the user authentication failed, presenting a message on the device indicating that user authentication has failed.

2. The method of claim 1, wherein the first code is a smile code that encodes a numeric value in a picture printed on the activation card.

3. The method of claim 1, further comprising:
    capturing, with the visible light sensor of the device, an image that was previously uploaded by the user to the online authentication service; and
    sending, to the online user authentication service, the image.

4. The method of claim 1, where the visible light sensor and IR light sensor are included in a single camera module.

5. A system comprising:
    an online service to:
        send an activation card to a user, the activation card for setting up or configuring a device for the user using an online service, the activation card including one or more codes;
        send the device to the user;
        receive activation data from the device, the activation data including or related to the one or more codes;
        authenticate the user based on the activation data; and
    the device to:
        capture, with a visible light sensor of the device, a first code printed on an activation card;
        capture, with an infrared (IR) light sensor, a second code printed on the activation card, the second code printed in IR ink;
        send, to an online user authentication service, the first code and the second code;
        receive, from the online user authentication service, data indicating results of the user authentication performed by the online user authentication service;
        responsive to the results indicating that user authentication was successful, activate one or more functions of the device; and
        responsive to the results indicating that the user authentication failed, present a message on the device indicating that user authentication has failed.

6. The system of claim 5, wherein the one or more codes are created based at least in part on information provided by the user during a check-out process at an online store where the user purchased the device online.

7. The system of claim 5, wherein a first side of the activation card has the image and a second, opposite side of the activation card includes the first and second codes.

8. The system of claim 5, wherein the IR light sensor captures an image of a palm of the user for identifying the user in subsequent access to the device or service through the device.

* * * * *